(12) United States Patent
Holmes

(10) Patent No.: US 8,109,303 B1
(45) Date of Patent: Feb. 7, 2012

(54) STUMP GRINDER HAVING AN AUTOMATIC DEPTH CONTROL SYSTEM

(75) Inventor: Kail Holmes, Vestaburg, MI (US)

(73) Assignee: Tramor, Inc., Remus, MI (US)

( * ) Notice: Subject to any disclaimer, the term of this patent is extended or adjusted under 35 U.S.C. 154(b) by 643 days.

(21) Appl. No.: 11/796,074

(22) Filed: Apr. 26, 2007

Related U.S. Application Data

(60) Provisional application No. 60/796,255, filed on Apr. 27, 2006.

(51) Int. Cl.
*A01G 23/06* (2006.01)

(52) U.S. Cl. ........................ 144/24.12; 241/36

(58) Field of Classification Search ............... 144/2.1, 144/4.1, 24.12, 34.1, 118; 37/302, 348, 382, 37/414, 415; 702/166; 175/24, 26; 172/2, 172/4, 4.5
See application file for complete search history.

(56) References Cited

U.S. PATENT DOCUMENTS

| | | | |
|---|---|---|---|
| 190,675 A | 5/1877 | Gaines |
| 589,236 A | 8/1897 | Williams |
| 604,283 A | 5/1898 | Albrect |
| 1,266,894 A | 5/1918 | Williams |
| 1,713,507 A | 5/1929 | Ammon |
| 1,752,290 A | 4/1930 | Ammon |
| 1,889,129 A | 11/1932 | Nielsen |
| 1,959,465 A | 5/1934 | Dryfoos |
| 2,026,790 A | 1/1936 | Mankoff |
| 2,128,194 A | 8/1938 | Sheldon |
| 2,318,219 A | 8/1940 | Harris |
| 2,244,577 A | 6/1941 | Schreiber |
| 2,357,916 A * | 9/1944 | Strandlund ................ 172/166 |
| 2,392,958 A | 1/1946 | Tice |
| 2,658,318 A | 11/1953 | Miller |
| 2,663,505 A | 12/1953 | Sennholtz |
| 2,678,169 A | 5/1954 | Tullis |
| 2,710,635 A | 6/1955 | Alexander |
| 2,837,290 A | 6/1958 | Nagel |
| 2,863,476 A | 12/1958 | Clark |
| 2,864,420 A | 12/1958 | Schmidt |
| 3,030,037 A | 4/1962 | Racz |
| 3,069,101 A | 12/1962 | Wexell |
| 3,076,489 A | 2/1963 | Schmidt et al. |

(Continued)

FOREIGN PATENT DOCUMENTS

DE    36 24 996 A1    2/1988

(Continued)

OTHER PUBLICATIONS

"Power-fed Mobile Wood Chippers—Operator Protection at Infeed Chutes", Health & Safety Executive, Agriculture Information Sheet No. 38, Sep. 2000.

*Primary Examiner* — David J. Walczak
*Assistant Examiner* — Jennifer C Chiang
(74) *Attorney, Agent, or Firm* — Paparella & Associates, PC; Joseph A. Paparella

(57) ABSTRACT

An automatic depth controlled cutting assembly for a stump grinder includes a cutting assembly operatively attached to a stump grinder for engaging and grinding a stump, an actuating assembly to actuate movement of the cutting assembly relative to the stump, and an automatic depth control system cooperating with the actuating assembly to automatically control a depth of the cutting assembly relative to the stump.

25 Claims, 5 Drawing Sheets

U.S. PATENT DOCUMENTS

| | | |
|---|---|---|
| 3,182,917 A | 5/1965 | Tamny et al. |
| 3,254,687 A | 6/1966 | Tertyshnikov |
| 3,276,700 A | 10/1966 | Eklund |
| 3,367,585 A | 2/1968 | Ratkowski |
| 3,394,474 A * | 7/1968 | Rockwell .................. 37/415 |
| 3,436,028 A | 4/1969 | Koehnen et al. |
| 3,463,405 A | 8/1969 | Shepherd |
| 3,509,924 A | 5/1970 | Newhouse, Jr. |
| 3,559,724 A | 2/1971 | Wilkinson |
| 3,635,410 A | 1/1972 | Smith |
| 3,642,214 A | 2/1972 | Blackwell, Jr. |
| 3,844,494 A | 10/1974 | Hightower |
| 3,868,062 A | 2/1975 | Cunningham et al. |
| 3,907,016 A | 9/1975 | Nicholson et al. |
| 3,907,216 A | 9/1975 | MacKissic et al. |
| 3,936,004 A | 2/1976 | Graf et al. |
| 3,939,886 A | 2/1976 | Tucek |
| 3,989,198 A | 11/1976 | Blasko |
| 4,022,021 A | 5/1977 | Russell, Jr. |
| 4,034,490 A * | 7/1977 | Teach ........................ 37/348 |
| 4,074,594 A | 2/1978 | Dall et al. |
| 4,077,450 A | 3/1978 | Ackerman |
| 4,117,985 A | 10/1978 | Lazareck |
| 4,129,260 A | 12/1978 | Baker |
| 4,146,184 A | 3/1979 | Whitney |
| 4,162,769 A | 7/1979 | Lapointe |
| 4,168,035 A | 9/1979 | Palm et al. |
| 4,176,721 A * | 12/1979 | Poggemiller et al. .......... 172/4 |
| 4,260,114 A | 4/1981 | Herder |
| 4,452,400 A | 6/1984 | Williams |
| 4,504,019 A | 3/1985 | Newell et al. |
| 4,523,892 A | 6/1985 | Mitchell et al. |
| 4,527,604 A | 7/1985 | Everett |
| 4,544,104 A | 10/1985 | Carlsson |
| 4,560,110 A | 12/1985 | Burda |
| 4,598,745 A | 7/1986 | Parviainen |
| 4,685,624 A | 8/1987 | Nidiffer et al. |
| 4,687,179 A | 8/1987 | Smith |
| 4,692,028 A | 9/1987 | Schave |
| 4,702,424 A | 10/1987 | Widlak |
| 4,716,823 A | 1/1988 | Capdevila |
| 4,717,083 A | 1/1988 | Quast et al. |
| 4,721,257 A | 1/1988 | Williams et al. |
| 4,793,561 A | 12/1988 | Burda |
| 4,796,819 A | 1/1989 | Waterman |
| 4,850,406 A | 7/1989 | Krautzberger |
| 4,872,500 A | 10/1989 | Duffey et al. |
| 4,906,486 A | 3/1990 | Young |
| 4,915,310 A | 4/1990 | Stelk |
| 4,917,314 A | 4/1990 | Manschwetus |
| 4,922,977 A | 5/1990 | Colton et al. |
| 4,967,969 A | 11/1990 | Griffith, III |
| 4,982,904 A | 1/1991 | Greiner |
| 5,005,620 A | 4/1991 | Morey |
| 5,018,672 A | 5/1991 | Peck et al. |
| 5,042,727 A | 8/1991 | Plante |
| 5,044,567 A | 9/1991 | Hausler et al. |
| 5,078,328 A | 1/1992 | Willingham |
| 5,088,532 A | 2/1992 | Eggers et al. |
| RE33,840 E | 3/1992 | Peterson et al. |
| 5,114,085 A | 5/1992 | Inui |
| 5,167,374 A | 12/1992 | Strohmeyer |
| 5,205,496 A | 4/1993 | O'Donnell et al. |
| 5,209,278 A | 5/1993 | Carpenter et al. |
| 5,263,651 A | 11/1993 | Nadarajah |
| 5,285,974 A | 2/1994 | Cesarini |
| 5,332,964 A | 7/1994 | Ouchi |
| 5,358,189 A | 10/1994 | Vandermolen |
| 5,362,004 A | 11/1994 | Bateman |
| 5,372,316 A | 12/1994 | Bateman |
| 5,377,919 A | 1/1995 | Rogers et al. |
| 5,413,286 A | 5/1995 | Bateman |
| 5,423,137 A * | 6/1995 | Cochran .................... 37/408 |
| 5,435,359 A * | 7/1995 | Craft .......................... 144/334 |
| 5,451,869 A | 9/1995 | Alff |
| 5,474,239 A | 12/1995 | Williams, Jr. et al. |
| 5,526,988 A | 6/1996 | Rine |
| 5,559,725 A * | 9/1996 | Nielson et al. ............... 700/302 |
| 5,588,474 A | 12/1996 | Egging |
| 5,655,581 A * | 8/1997 | Craft ......................... 144/24.12 |
| 5,667,152 A | 9/1997 | Mooring |
| 5,680,854 A * | 10/1997 | Kingsley et al. ............. 125/13.03 |
| 5,692,548 A | 12/1997 | Bowers et al. |
| 5,743,314 A * | 4/1998 | Puch .......................... 144/24.12 |
| 5,794,673 A * | 8/1998 | Milbourn et al. ........... 144/24.12 |
| 5,845,689 A | 12/1998 | Egging et al. |
| 5,988,539 A | 11/1999 | Morey |
| 6,000,642 A | 12/1999 | Morey |
| 6,003,570 A * | 12/1999 | Falatok et al. ............... 144/24.12 |
| 6,014,996 A | 1/2000 | Egging et al. |
| 6,016,855 A | 1/2000 | Morey |
| 6,032,707 A | 3/2000 | Morey et al. |
| 6,036,125 A | 3/2000 | Morey et al. |
| 6,230,770 B1 * | 5/2001 | Spaargaren .................... 144/334 |
| 6,293,479 B1 | 9/2001 | Kaczmarski et al. |
| 6,305,445 B1 | 10/2001 | Falatok |
| 6,357,684 B1 | 3/2002 | Morey |
| 6,431,231 B1 * | 8/2002 | Braaten et al. ............... 144/24.12 |
| 6,484,711 B2 * | 11/2002 | Acker et al. ................. 125/13.01 |
| 6,701,857 B1 * | 3/2004 | Jensen et al. ................... 111/200 |
| 6,729,567 B1 | 5/2004 | Morey |
| 6,814,320 B1 | 11/2004 | Morey et al. |
| 6,830,204 B1 | 12/2004 | Morey |
| 7,011,124 B1 | 3/2006 | Morey |
| 7,150,300 B1 * | 12/2006 | Peterson .................... 144/24.12 |
| 2002/0070301 A1 | 6/2002 | Stelter et al. |

FOREIGN PATENT DOCUMENTS

DE  38 08 487 C1  5/1989

* cited by examiner

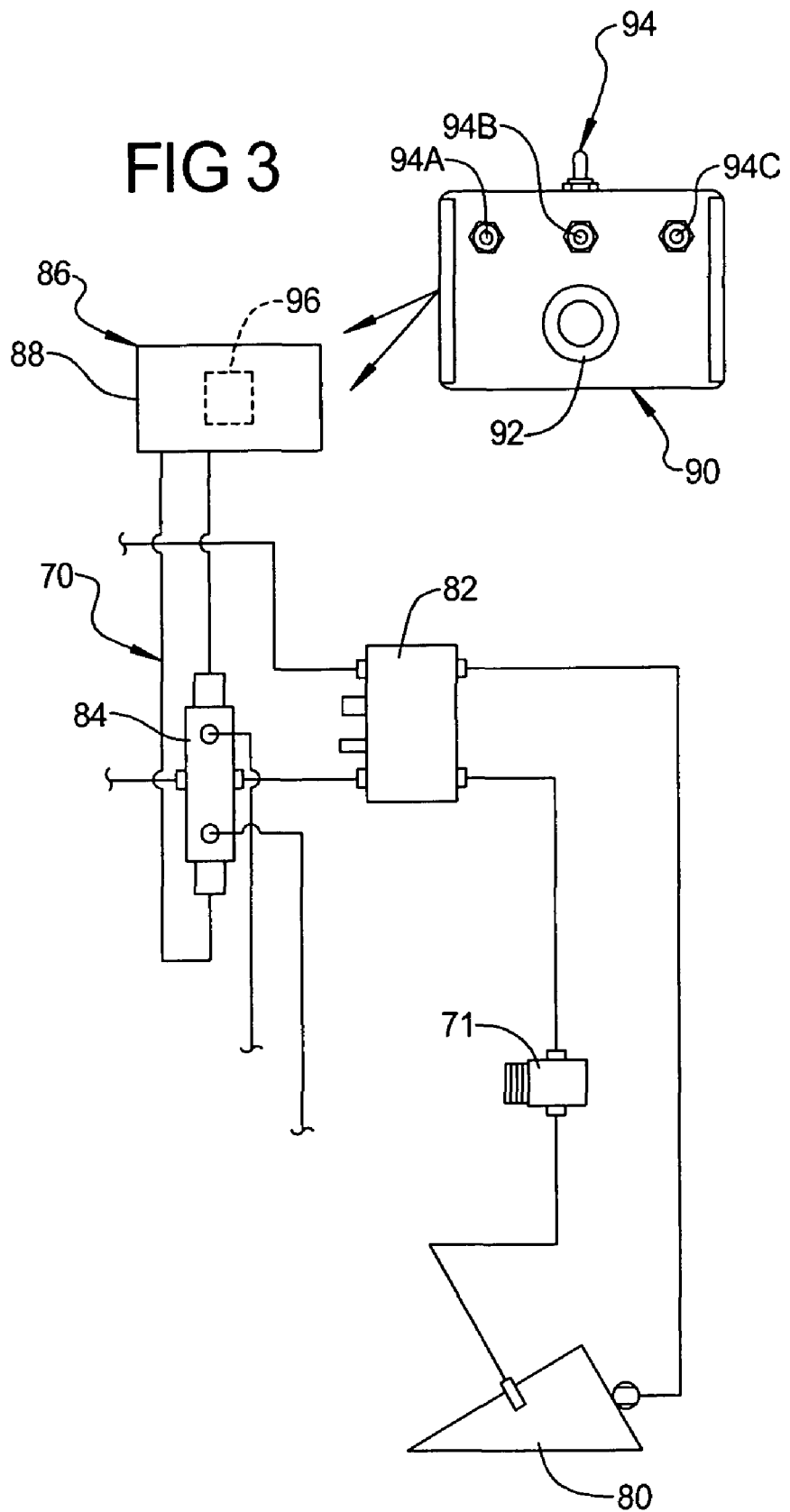

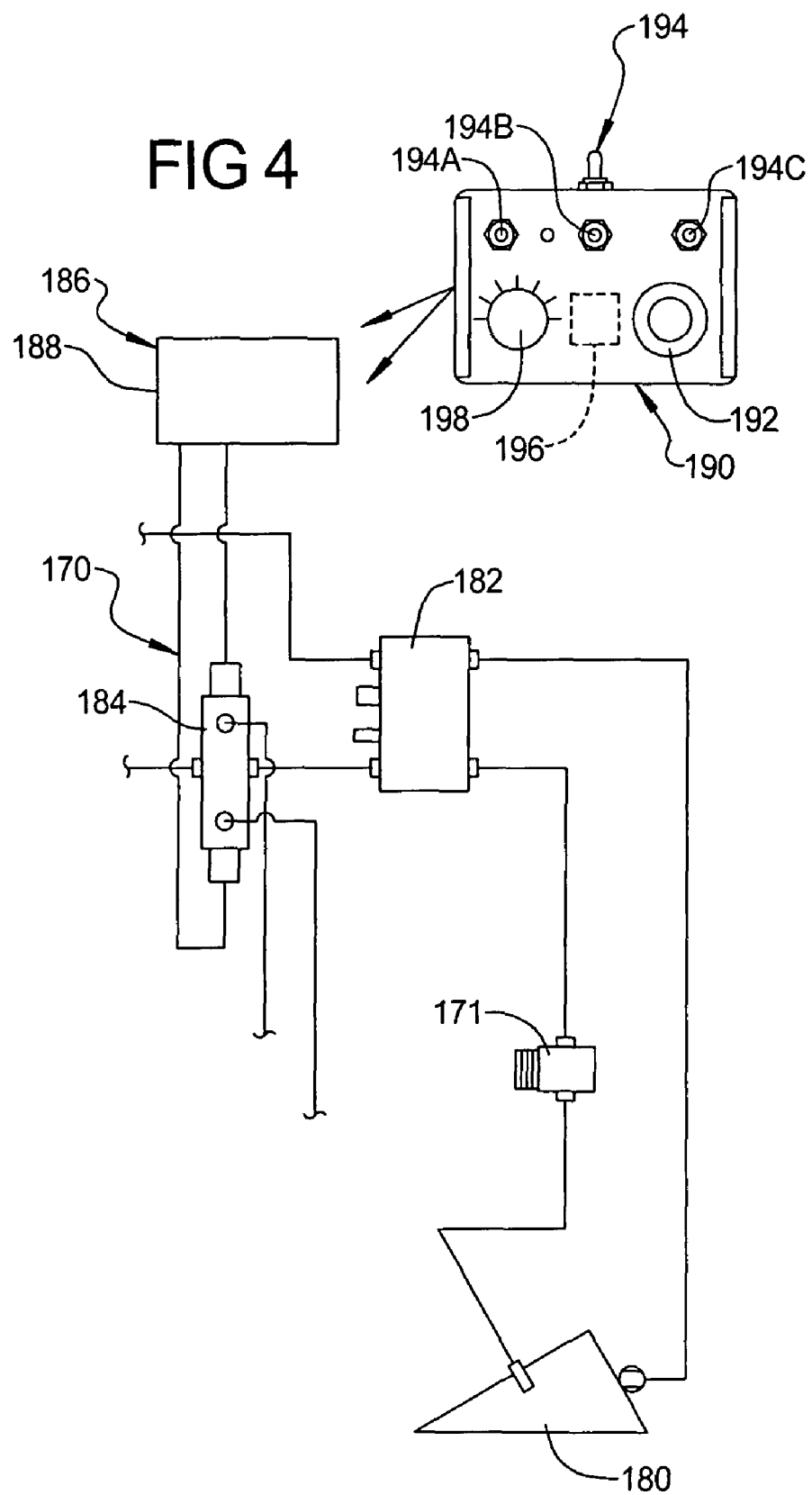

STUMP GRINDER HAVING AN AUTOMATIC DEPTH CONTROL SYSTEM

CROSS-REFERENCE TO RELATED APPLICATION(S)

The present invention claims the priority date of copending U.S. Provisional Patent Application Ser. No. 60/796,255, filed Apr. 27, 2006.

BACKGROUND OF THE INVENTION

1. Field of the Invention

The present invention relates generally to stump grinders and, more particularly, to a stump grinder having an automatic depth control system.

2. Description of the Related Art

It is known to provide a stump grinder for grinding undesirable tree stumps. Typically, a stump grinder includes a frame, an engine or other drive mechanism such as a belt tension engagement mounted to the frame, a cutting assembly having a boom pivotally secured to the frame, and a rotatable cutting wheel operatively supported by the boom and driven by the engine. The stump grinder also includes an actuating assembly to move the stump grinder and/or cutting assembly relative to the stump. Such actuating assemblies are typically hydraulic in nature, but may also be pneumatic, electronic, or mechanical. The stump grinder further includes a control system to control the direction and rate of movement of the actuating assembly. Such control systems are typically electronic in nature, but may be hydraulic, pneumatic, or mechanical.

During removal of a tree stump from a landscape, an operator directs the movement of the actuating assembly through the control system to cause the cutting assembly to engage a portion of the stump. As the cutting assembly engages the stump, the operator will typically laterally advance or feed the rotatable cutting wheel across an upper surface of the stump, grinding away a top portion of the stump. Upon completion of a lateral pass across the stump, the operator will direct the cutting assembly in a downward manner through the control system to engage the top surface of the stump and once again direct the rotatable cutting wheel across the upper surface of the stump in a lateral motion. This process is repeated until the stump is completely ground to an acceptable depth, which is typically below a grade of the landscape. Thus, the manner in which the operator controls the actuating assembly through the control system will directly affect the rate at which the cutting assembly will grind a stump.

Accordingly, the productivity of the stump grinder is dependent on the operator to maintain an appropriate rate of speed and depth of the cutting assembly into the stump. Placing the cutting assembly at too great a depth into the stump will slow the rotation of the cutting assembly and overwork the engine, which may result in engine stall or part failure. When the engine stalls or a part fails, the stump grinder may become plugged or otherwise inoperable. As a result, the stump grinder has to be unplugged or serviced, the engine restarted, and then redirected at the stump. This is a relatively time consuming and labor intensive process, resulting in higher costs, which is undesired. Conversely, placing the cutting assembly at too little depth into the stump will under-work the engine causing a more time consuming process than otherwise necessary, resulting in a loss of productivity and higher operational costs.

Conventionally, maintaining a balance between overworking and under-working the engine is based on an operator's sensory perception of a working stump grinder. By way of example, an operator makes a depth adjustment based on engine sound or vibration felt in the controls. However, an operator's sensory perception is highly subjective relative to one's skill/experience, ambient conditions, stump condition, etc. and therefore subject to a loss of maximum efficiency.

While known stump grinders have generally worked for their intended purpose, there remains a need in the art for stump grinders that provide improved output efficiency. More specifically, there is a need in the art to provide a stump grinder that overcomes the disadvantage of overworking or under-working the engine as a result of improper depth placement of the cutting assembly into a stump during operation. Therefore, there is a need in the art for a stump grinder that overcomes the above disadvantages by having a control system that automatically sets the depth of the cutting assembly during operation.

SUMMARY OF THE INVENTION

Accordingly, the present invention is an automatic depth controlled cutting assembly for a stump grinder includes a cutting assembly operatively attached to a stump grinder for engaging and grinding a stump. The automatic depth controlled cutting assembly also includes an actuating assembly to actuate movement of the cutting assembly relative to the stump. The automatic depth controlled cutting assembly further includes an automatic depth control system cooperating with the actuating assembly to automatically control a depth of the cutting assembly relative to the stump.

In addition, the present invention is a stump grinder including a frame and a cutting assembly operatively supported by the frame. The stump grinder also includes an actuating assembly operatively connected to the frame to actuate operational movement of the cutting assembly relative to the stump. The stump grinder further includes an automatic depth control system cooperating with the actuating assembly to automatically control a depth of the cutting assembly relative to the stump.

One advantage of the present invention is that an automatic depth control system is provided for a stump grinder. Another advantage of the present invention is that the automatic depth control system directs operational movement of a cutting assembly of the stump grinder relative to a stump from a first position to a second position that is a predetermined distance away from the first position for improved stump grinding efficiency. Yet another advantage of the present invention is that the automatic depth control system enables the operator to direct the cutting assembly to a selected, predetermined depth after each lateral movement across the stump for improved output efficiency. A further advantage of the present invention is that the automatic depth control system is integrated within a control system that can be used with an actuating assembly of the stump grinder that is powered hydraulically, electronically, or pneumatically.

Other features and advantages of the present invention will be readily appreciated, as the same becomes better understood, after reading the subsequent description when taken in conjunction with the accompanying drawings.

BRIEF DESCRIPTION OF THE DRAWINGS

FIG. 3 is a schematic diagram of a control system having the automatic depth control system illustrated in FIG. 1, according to one embodiment of the present invention.

FIG. 4 is a schematic diagram of a control system having the automatic depth control system illustrated in FIG. 1, according to another embodiment of the present invention.

DESCRIPTION OF THE PREFERRED EMBODIMENT(S)

Figure 1:
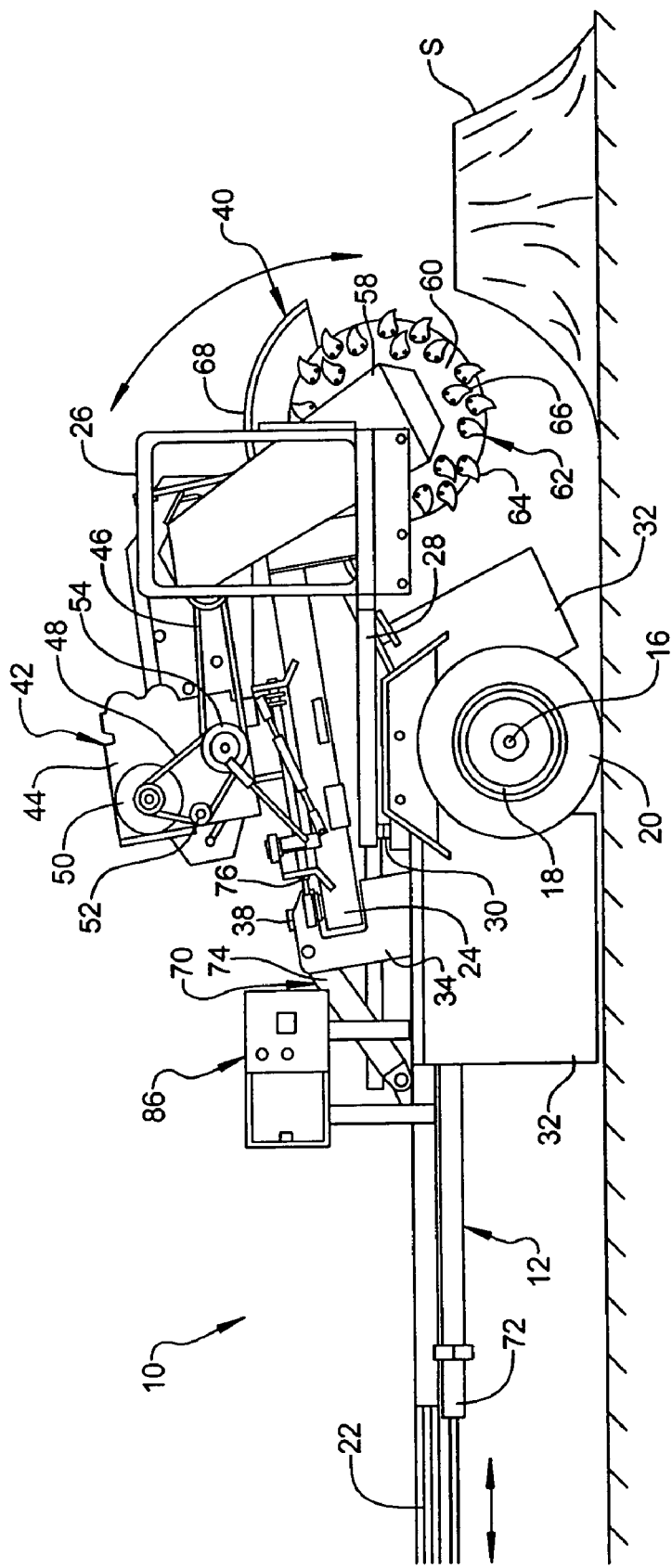
FIG. 1 is an elevational view of an automatic depth control system, according to the present invention, illustrated in operational relationship with a stump grinder.
Figure 2A:
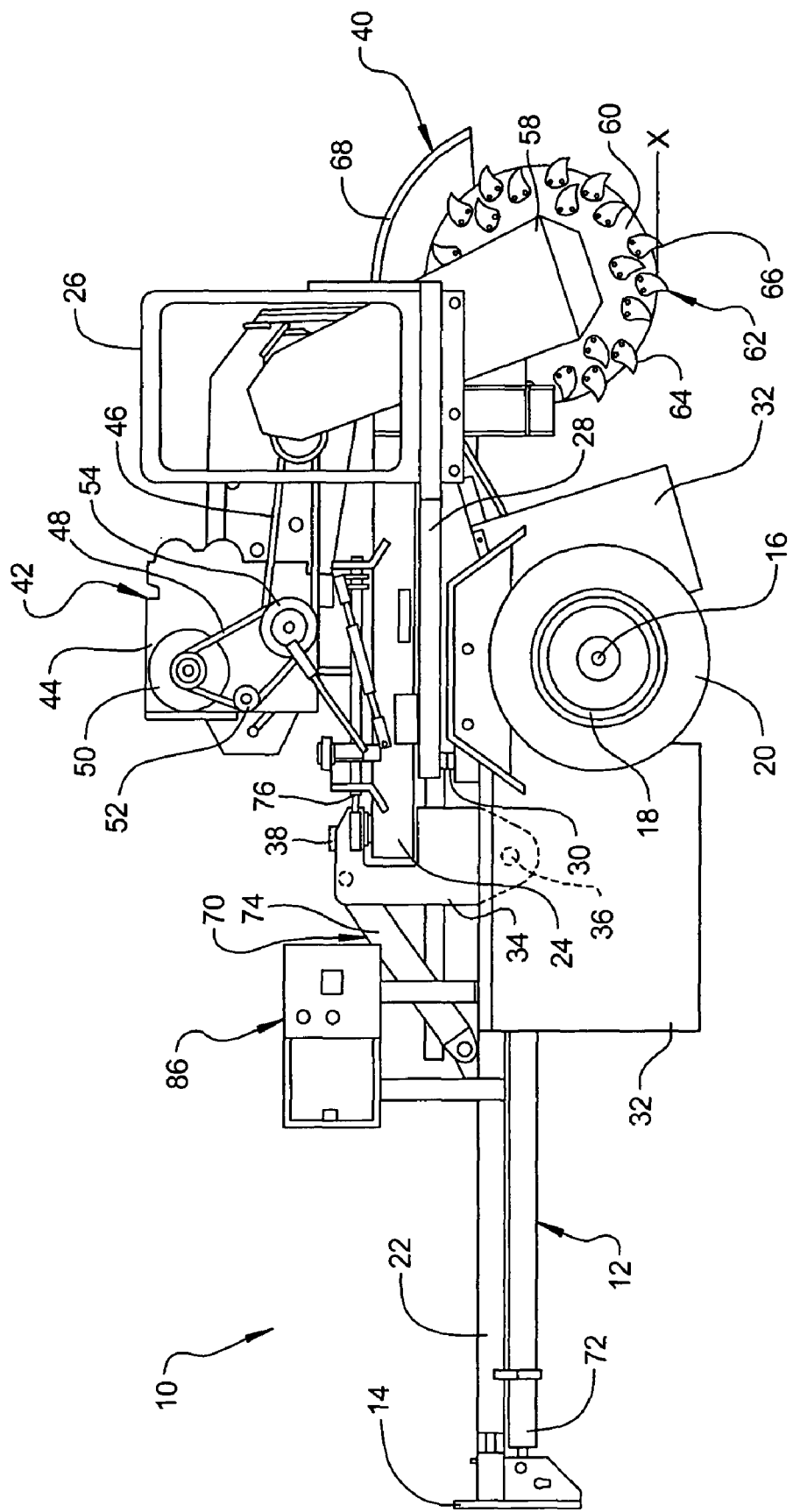
FIG. 2A is a side elevational view of the automatic depth control system and stump grinder of FIG. 1 in a first position.

Referring now to the drawings and in particular FIGS. 1 through 2A, one embodiment of a stump grinder 10, according to the present invention, is shown. The stump grinder 10 includes a frame, generally indicated at 12. The frame 12 extends longitudinally. The stump grinder 10 also includes a hitch assembly 14 at one longitudinal end of the frame 12 to receive a hitch of a vehicle (not shown) for towing behind the vehicle. The stump grinder 10 includes an axle 16 rotatably supported by the frame 12, wheel rims 18 operatively connected to the axle 16, and tires 20 attached to the wheel rims 18 to facilitate movement of the stump grinder 10 during transportation and movement relative to a stump (S).

As illustrated in FIGS. 1 through 2A, the frame 12 includes a first or lower section 22 and a second or upper section 24 operatively supported by the lower section 22. The upper section 24 is disposed over the lower section 22 and movable relative to the lower section 22. The lower section 22 includes an operational viewing window 26 and an arm 28 pivotally mounted relative to the frame 12 about a pivot point 30. The operational viewing window 26 is connected to the arm 28. The operational viewing window 26 provides an operator (not shown) of the stump grinder 10 with shielded viewing access during operation. It should be appreciated that the arm 28 may be jointed to further position the operational viewing window 26 or may include a telescoping feature to further extend the operational viewing window 26 relative to the frame 12.

The lower section 22 also includes a flexible curtain 32 that depends or hangs from the frame 12 to shield the legs of an operator (not shown) from comminuted stump material that may be thrown during operation. The curtain 32 may extend around the rear and sides of the frame 12 or may exclusively extend below the operational viewing window 26.

Figure 2B:
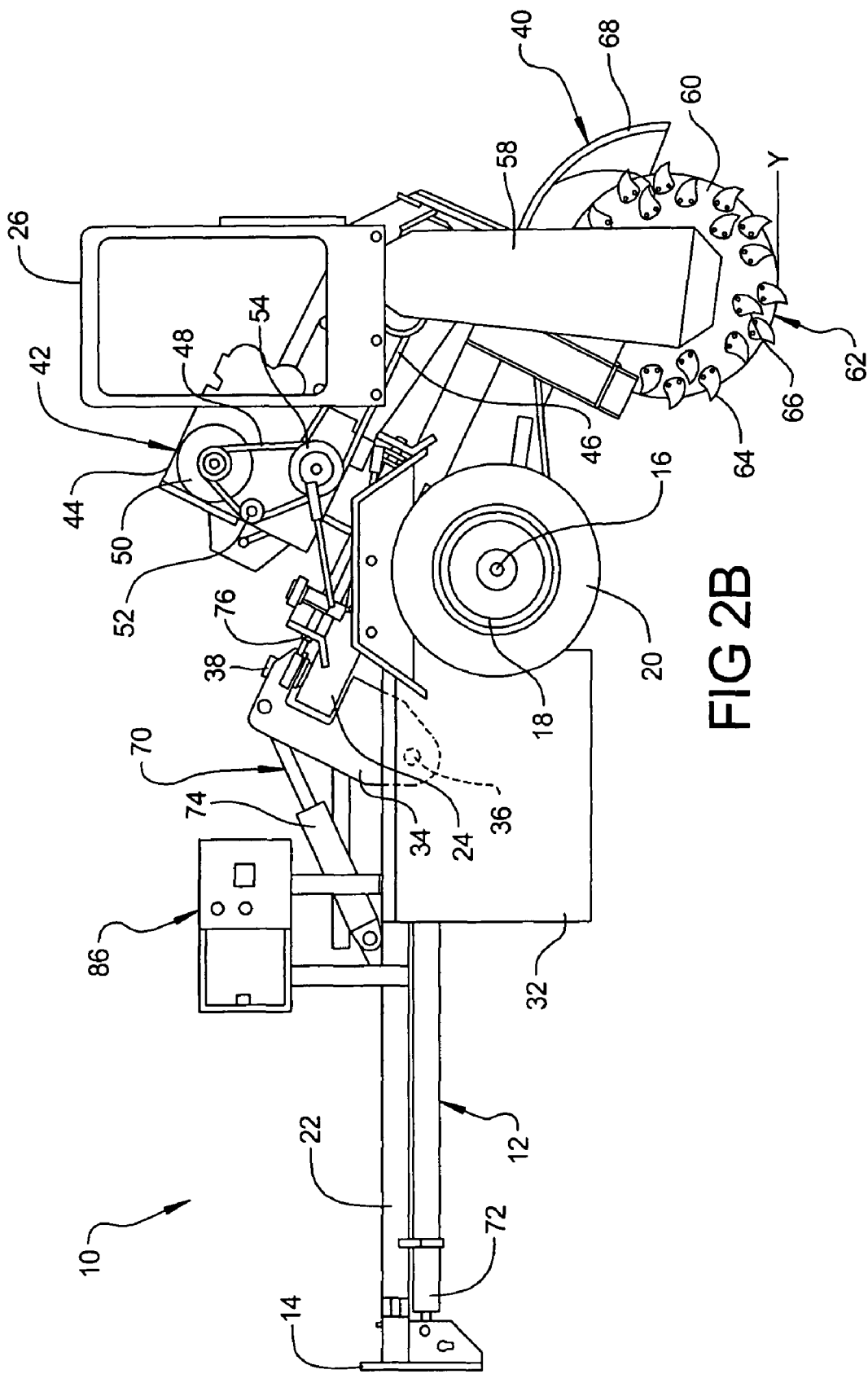
FIG. 2B is a view similar to FIG. 2A illustrating a downward vertical movement of a cutting assembly of the stump grinder from the first position illustrated in FIG. 2A to a second position in response to the automatic depth control system.

The frame 12 includes a connector member 34 pivotally attaching the upper section 24 to the lower section 22. The connector member 34 has a first pivot pin 36 disposed along a horizontal axis and connected to the lower section 22. The first pivot pin 36 permits the upper section 24 to move in a vertical manner relative to the lower section 22 (FIGS. 2A and 2B). The connector member 34 further includes a second pivot pin 38 disposed along a vertical axis and connected to the upper section 24. The second pivot pin 38 permits the upper section 24 to move in a lateral manner relative to the lower section 22. It should be appreciated that pivoting of the frame 12 enables movement of the stump grinder 10 relative to the stump (S) for efficient operation. It should also be appreciated that, without pivoting movement, the present invention would require a towing vehicle (not shown) to re-position the stump grinder 10 to effectively remove the stump (S) from a landscape.

Both the upper and lower sections 22, 24 are generally constructed of metal such as steel and are generally rectangular in cross-section. It should be appreciated that the upper and lower sections 22, 24 of the frame 12 may be constructed from any material suitable for use in connection with stump grinding and may have any suitable cross-sectional shape. It should also be appreciated that, while the frame 12 is shown in a bisected manner, the frame 12 may be of a unitary construction and pivoting maintained through pivotal movement of a cutting assembly, generally indicated at 40 and to be described, relative to the frame 12.

The stump grinder 10 further includes a drive assembly, generally indicated at 42, to drive the cutting assembly 40. The drive assembly 42 is mounted to the frame 12. The drive assembly 42 includes an engine 44 operatively coupled to the cutting assembly 40 by a drive mechanism (not shown). It should be appreciated that the drive mechanism may include a drive shaft, belt, or chain drive adapted to drive the cutting assembly 40.

Referring to FIGS. 1 through 2B, the drive assembly 42 further includes at least one, preferably a plurality of pulleys 50, 52, 54 and belts 46, 48 disposed over and interconnecting the pulleys 50, 52, 54. The drive mechanism 42 may include other pulleys (not shown). It should be appreciated that the engine 44 may be an internal combustion engine or may operate through some other manner. It should also be appreciated that while the engine 44 is shown operatively mounted to the upper section 24 of the frame 12, the engine 44 may be remotely located relative to the stump grinder 10 and operatively connected to the cutting assembly 40 by the drive assembly 42 such as in a power take-off (PTO) system (not shown).

The stump grinder 10 further includes a cutting assembly 40 operatively coupled to the drive assembly 42. The cutting assembly 40 includes a boom 58 operatively supported by the frame 12 at one end and a cutting wheel 60 rotatably connected at the other end of the boom 58. The cutting wheel 60 rotates relative to the boom 58 and includes a plurality of cutting teeth, generally indicated at 62, to engage the stump (S). It should be appreciated that the cutting wheel 60 is operatively coupled to the engine 44 by the drive mechanism (not shown).

As illustrated in FIGS. 1 through 2B, the cutting teeth 62 include a primary set 64 having a primary function of engaging the stump (S) and a secondary set 66 adjacent the primary set 64 for removing the comminuted material away from the primary set 64. The cutting assembly 40 further includes a guard 68 disposed adjacent and connected to the boom 58 to cover a top section of the cutting wheel 60. The guard 68 prevents comminuted material from being ejected in an upward manner. It should be appreciated that the cutting wheel 60 may include a plurality of a hooks, knives, or bars (not shown) to convert the stump (S) into comminuted material.

Referring now to FIGS. 1 through 3, the stump grinder 10 includes an actuating assembly, according to the present invention and generally indicated at 70, to actuate movement of the cutting assembly 40 relative to the stump (S). The actuating assembly 70 is operatively connected to the connector member 34 and to the cutting assembly 40. In the illustrated embodiment, the actuating assembly 70 is powered by hydraulic fluid and is in operative communication with the drive assembly 42 to provide power for delivery of pressurized hydraulic fluid such as oil. It should be appreciated that the actuating assembly 70 may also be powered pneumatically or electrically.

The actuating assembly 70 includes a pump 71 and a plurality of fluid cylinders 72, 74, 76, 78 fluidly connected to the pump 71. The pump 71 is operatively connected to the drive assembly 42 and/or engine 44 to pump pressurized fluid to the fluid cylinders 72, 74, 76, 78. It should be appreciated that each of the fluid cylinders 72, 74, 76, 78 includes an inlet port and an outlet port through which pressurized fluid is directed in/out of the fluid cylinders 72, 74, 76, 78 during operation.

The fluid cylinders 72, 74, 76, 78 actuate movement of the cutting assembly 40 relative to the stump (S). Specifically, the fluid cylinder 72 is a tongue cylinder to actuate the stump grinder 10 in a fore and aft movement relative to the stump (S) (FIGS. 1 through 2A). The fluid cylinder 74 is a vertical cylinder to actuate the upper section 24 of the frame 12 in a vertical manner about the first pivot pin 36 (FIGS. 2A through 2B) to adjust the depth of the cutting assembly 40 relative to a stump (S). It should further be appreciated the fluid cylinder 74 may be operatively engaged to the stump grinder 10 so as to actuate only the cutting assembly 40 in a vertical manner to facilitate depth adjustment relative to a stump (S).

The fluid cylinders 76 and 78 are a pair of swing cylinders to actuate the upper section 24 of the frame 12 in a lateral movement about the second pivot pin 38. As illustrated in FIGS. 1 through 2B, the two fluid cylinders 76 and 78 act as swing cylinders for actuating the cutting wheel 60 in a lateral motion across the stump (S) while only one fluid cylinder 72 or 74 is employed for actuating the cutting wheel 60 in either a vertical or fore/aft motion. It should be appreciated that the stump grinder 10 may include any number of fluid cylinders to actuate a desired motion of the cutting assembly 40.

The actuating assembly 70 further includes a storage tank 80 and a feed manifold 82. The storage tank 80 and the feed manifold 82 are operatively connected to the pump 71 through fluid lines wherein the pump 71 is disposed or connected between the storage tank 80 and the feed manifold 82. The feed manifold 82 receives pressurized fluid from the pump 71 and directs it to the appropriate fluid cylinder(s) 72, 74, 76 and 78 to actuate the desired movement of the stump grinder 10. It should be appreciated that pump 71, storage tank 80, and feed manifold 82, as well as the other components of the actuating assembly 70 are interconnected by a plurality of fluid lines. It should further be appreciated that a pressure relief mechanism (not shown) can be disposed along any fluid supply line as needed.

The actuating assembly 70 further includes an actuator block 84. The actuator block 84 receives pressurized fluid from the feed manifold 82 and regulates the flow of pressurized fluid toward and away from the cylinders 72, 74, 76 and 78 in response to controls from an automatic depth control system 86 to be described.

Referring to FIG. 3, the stump grinder 10 further includes an automatic depth control system, generally indicated at 86, to automatically control the depth of the cutting assembly 40. In one embodiment, the automatic depth control system 86 includes a receiver 88 operatively connected to the actuating assembly 70. More specifically, the receiver 88 is operatively connected to the actuator block 84 to control direction of fluid through the actuator block 84 to the cylinders 72, 74, 76 and 78 in response to operator input, thereby controlling the operational movement of the stump grinder 10 or the cutting assembly 40. It should be appreciated that the receiver 88 is an electrical device receiving power from a power source (not shown) and receives signals from a controller 90 to be described.

The automatic depth control system 86 further includes a controller, generally indicated at 90, to transmit a signal to the receiver 88 or otherwise electronically communicate with the receiver 88. As illustrated in FIG. 3, the controller 90 is a remote control unit adapted to communicate with the receiver 88 through radio frequency signals. It should be appreciated that controller 90 may be fixed to the stump grinder 10 or may be removed from the frame 12, while remaining hardwired to the receiver 88 (i.e. tethered) to provide the operator with a more suitable viewing angle of the operational movement of the cutting assembly 40.

The controller 90 includes a plurality of controls including an emergency off button 92 to stop the operation of the stump grinder 10. The controller 90 further includes at least one actuating member, generally indicated at 94, to signal the receiver 88 to actuate the cutting assembly 40. As illustrated in FIG. 3 the controller 90 includes three actuating members 94 in the form of toggle switches 94(A), 94(B), and 94(C). The toggle switches 94(A), 94(B) and 94(C) enable the operator to move the stump grinder 10 in the vertical direction, lateral direction, and in the axial direction, respectively. It should be appreciated that the actuating members 94 may be constructed from other control devices, such as buttons, knobs, a joystick, or multiple joysticks.

During operation of the stump grinder 10, the drive assembly 42 rotates cutting assembly 40. Additionally, the pump 71 directs pressurized fluid from the storage tank 80 to the feed manifold 82, which transfers fluid to the actuator block 84. When the operator moves the actuating member 94 on the controller 90, a signal is transmitted to the receiver 88. The receiver 88 processes the signal and supplies voltage to a coil (not shown) that directs the actuator block 84 to allow pressurized fluid to flow toward or away from one or more of the cylinders 72, 74, 76 and 78 for a predetermined time. The predetermined time that voltage is supplied to the coil is controlled by how long the operator continues to hold the actuating member 94 in a particular position. It should be appreciated that, as a result, the movement of the stump grinder 10 is controlled entirely by the operator.

The automatic depth control system 86, according to the present invention, includes an automatic depth control circuit 96. The automatic depth control circuit 96 enables the operator to engage or "bump" the toggle switch 94A to affect consistent vertical movement of the cutting assembly 40 from a first position (X) (FIG. 2A) to a second position (Y) (FIG. 2B) that is a predetermined distance from the first position (X) (hereinafter referred to as a "predetermined length of travel"). It should be appreciated that the predetermined length of travel may include a single movement from a range between less than one half inch to six inches, with a preferred range between one half inch and three and one half inches.

Referring to one embodiment of the automatic depth control system 86 illustrated in FIG. 3, the automatic depth control circuit 96 is located within the receiver 88 and regulates the manner in which the automatic depth control system 86 directs the actuator block 84 to move fluid to the cylinder 74. More specifically, upon receipt of the "bump" signal from the controller 90 corresponding to the toggle switch 94A, the automatic depth control circuit 96 within the receiver 88 will supply voltage to a coil (not shown) of the actuator block 84 to direct the actuator block 84 to open a valve (not shown) therein corresponding to the cylinder 74 for a predetermined time. Where the predetermined length of travel is one half inch, the voltage is supplied at a rate of 130 milliseconds (ms) and where the predetermined depth adjustment is three inches, the voltage is supplied at a rate of 780 ms. It should be appreciated that the aforementioned voltage supply times will vary depending on the hydraulic components employed within the stump grinder 10. It should also be appreciated that the voltage supply times will also vary depending on the level of voltage to be supplied.

As a result, the predetermined length of travel controlled by the automatic depth control circuit 96 is set by a manufacturer of the stump grinder 10. It should be appreciated that once set by the manufacturer, each activation of the actuating member 94 will affect the predetermined length of travel. Accordingly, the operator of the stump grinder 10 may opt to "bump" the toggle switch 94A more than once to provide consistent depth adjustment between lateral passes that are greater than the preset or predetermined adjustment. It should also be appreciated that the automatic depth control circuit 96 controls may provide for a manual depth adjustment as well. By way of example, where the operator activates and holds the actuating member 94, the vertical movement of the cutting assembly 40 will correspond directly to the length of time the actuating member 94 is held by the operator.

Additionally, it should be appreciated that while the automatic depth control system 86 of the present invention has been described in connection with having an automatic depth control circuit 96 for depth of the cutting assembly 40, the automatic movement of the present invention may be employed in connection with adjusting the axial movement as well. It should further be appreciated that while the automatic depth adjustment circuit 96 is employed in connection with the stump grinder 10 having the hydraulic actuating assembly 70, the present invention may also be employed in connection with actuating assemblies using electronic, pneumatic or mechanical actuation.

Referring to FIG. 4, another embodiment, according to the present invention, of the automatic depth control system 86 is illustrated. Like numerals of the automatic depth control system 86 have like reference numerals increased by one hundred (100). As illustrated in FIG. 4, the automatic depth control system 186 includes similar structure to the automatic depth control system 86 shown in FIG. 3. However, the automatic depth control system 186 illustrated in FIG. 4 includes the automatic depth control circuit 196 within the controller 190. It should be appreciated that the automatic depth control circuit 196 functions in the similar manner as that described with respect to the embodiment illustrated in FIG. 3.

As illustrated in FIG. 4, the controller 190 further includes an adjustable automatic depth control dial 198. The adjustable automatic depth control dial 198 enables the operator to adjust the predetermined length of travel regulated by the automatic depth control circuit 196. Accordingly, the operator may adjust the "bump" feature for the toggle switch 194A between any one of a number of pre-set depths within a predetermined range. It should be appreciated that the predetermined range of pre-set depths may extend between less than one half inch to six inches, with a preferred range between one half inch and three and one half inches. It should be appreciated that the remaining components disclosed with respect to the embodiment illustrated in FIG. 3 are incorporated by reference as though fully set forth with respect to the embodiment illustrated in FIG. 4.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An automatic depth controlled cutting assembly for a stump grinder comprising:
   a cutting assembly operatively attached to a stump grinder for engaging and grinding a stump;
   an actuating assembly operatively attached to said stump grinder to actuate movement of said cutting assembly relative to the stump; and
   an automatic depth control system cooperating with said actuating assembly to automatically adjust said cutting assembly by incrementally adjusting the cutting assembly by a predetermined depth wherein each incremental adjustment is in response to an operator input.

2. An automatic depth controlled cutting assembly as set forth in claim 1 wherein said automatic depth control system includes a receiver operatively attached to said actuating assembly to activate said actuating assembly.

3. An automatic depth controlled cutting assembly as set forth in claim 2 wherein said automatic depth control system includes a controller communicating with said receiver to activate said actuating assembly to move said cutting assembly in a vertical direction to a predetermined length of travel.

4. An automatic depth controlled cutting assembly as set forth in claim 3 wherein said controller includes at least one actuating member to signal said receiver to activate said actuating assembly in response to operator activation.

5. An automatic depth controlled cutting assembly as set forth claim 4 wherein said predetermined length of travel is between $\leq 0.5$ inch and $\leq 6.0$ inches.

6. An automatic depth controlled cutting assembly as set forth in claim 4 wherein said controller further includes an adjustable automatic depth control selector having a plurality of pre-set depths, said adjustable automatic depth control selector being adapted to provide manual adjustment of said predetermined length of travel to one of said plurality of pre-set depths.

7. An automatic depth controlled cutting assembly as set forth in claim 6 wherein said adjustable automatic depth control selector is operatively attached to said at least one actuating member to regulate the signal for vertical movement of said cutting assembly to a predetermined time corresponding to the pre-set depth in response to operator input upon said at least one actuating member.

8. An automatic depth controlled cutting assembly as set forth in claim 6 wherein said plurality of pre-set depths extend in 0.5 inch increments from 0.5 inch through 6 inches.

9. An automatic depth controlled cutting assembly as set forth in claim 2 wherein said automatic depth control system includes a depth control circuit to regulate communication between said receiver and said cutting assembly for vertical movement to a predetermined time that corresponds to said predetermined length of travel.

10. An automatic depth control system as set forth in claim 9 wherein said depth control circuit is integrated with said receiver.

11. An automatic depth control system as set forth in claim 9 wherein said depth control circuit is integrated with said controller.

12. A stump grinder comprising:
   a frame;
   a cutting assembly operatively supported by said frame;
   an actuating assembly operatively connected to said frame and said cutting assembly, said actuating assembly adapted to direct movement of said cutting assembly relative to a stump; and
   an automatic depth control system operatively connected to said actuating assembly to incrementally and automatically adjust said cutting assembly by a predefined and fixed increment in response to a single operator input;
   whereby grinding of the stump is effectuated by incrementally adjusting the cutting assembly by the predefined and fixed increment, each incremental adjustment in response to a single operator input.

13. A stump grinder as set forth in claim 12 wherein said automatic depth control system includes a receiver adapted to activate said actuating assembly.

14. A stump grinder as set forth in claim 13 wherein said automatic depth control system includes a controller communicating with said receiver to signal said receiver to activate said actuating assembly to move said cutting assembly in a vertical direction to a predetermined length of travel.

15. A stump grinder as set forth in claim 14 wherein said automatic depth control system includes a depth control circuit to regulate movement of said cutting assembly in the vertical direction to a predetermined length of travel.

16. A stump grinder as set forth in claim 15 wherein said depth control circuit is integrated with said receiver.

17. A stump grinder as set forth in claim 15 wherein said depth control circuit is integrated with said controller.

18. A stump grinder as set forth in claim 14 wherein said automatic depth control system includes at least one actuating member on said controller to regulate movement of said cutting assembly to said predetermined length of travel in response to operator activation.

19. A stump grinder as set forth in claim 14 wherein said predetermined length of travel is between $\leq 0.5$ inch and $\leq 6.0$ inches.

20. A stump grinder as set forth in claim 14 wherein said controller further includes an adjustable automatic depth control selector having a plurality of pre-set depths, said adjustable automatic depth control selector being adapted to provide manual adjustment of said predetermined length of travel to one of said plurality of pre-set depths.

21. A stump grinder as set forth in claim 20 wherein said adjustable automatic depth control selector is operatively attached to said at least one actuating member to regulate the signal for vertical movement of said cutting assembly to a predetermined time corresponding to the pre-set depth in response to operator input upon said actuating member.

22. A stump grinder as set forth in claim 20 wherein said plurality of pre-set depths extend in 0.5 inch increments from 0.5 inch through 6 inches.

23. A stump grinder as set forth in claim 12 wherein said actuating assembly includes a plurality of cylinders to move said cutting assembly in vertical, lateral, and axial directions and said automatic depth control system is in communication with said actuating assembly to control a direction of pressurized fluid to said cylinders.

24. A stump grinder comprising:
a frame including a first and a second section, the first and second section movable relative to one another in a lateral and vertical direction;
a trailer hitch connected to the frame for towing the stump grinder;
a cutting assembly operatively supported by the second section of the frame, the cutting assembly comprising a cutting disc;
the cutting disc comprising a primary and secondary set of teeth for grinding a stump in the lateral and vertical direction;
an actuating assembly operatively connected to the frame and the cutting assembly, the actuating assembly adapted to move the cutting assembly in the lateral and vertical direction; an automatic depth control system operatively connected to the actuating assembly to adjust the cutting assembly by a predetermined depth, the predetermined depth less than an acceptable depth as determined by an operator;
an actuating member operatively connected to the automatic depth control system to enable an operator to affect incremental and consistent vertical movement of the cutting assembly upon actuation thereof; and
wherein the cutting assembly is incrementally adjusted by the predetermined depth upon each activation of an actuating member, so as to incrementally adjust the cutting assembly through a series of consistent vertical movements, each movement comprising the predetermined depth and in response to each activation of the actuating member until the acceptable depth is achieved.

25. A stump grinder comprising:
a frame including a first and a second section, the first and second section pivotally attached to move relative to one another in a lateral and vertical direction;
a trailer hitch connected to the frame for towing the stump grinder;
a cutting wheel operatively supported by the second portion of the frame, the cutting wheel comprising a primary and secondary set of teeth for grinding a stump in the lateral and vertical direction relative to the stump;
an actuating assembly operatively connected to the frame and the said cutting wheel, the actuating assembly adapted to move the cutting wheel in the lateral and vertical direction; and
an automatic depth control system operatively connected to the actuating assembly to incrementally adjust the cutting wheel to a final depth through a plurality of incremental adjustments to the cutting wheel, each adjustment being initiated by an operator and comprising a predetermined length of travel.

* * * * *